United States Patent
Bell et al.

[11] Patent Number: 5,971,477
[45] Date of Patent: Oct. 26, 1999

[54] SEATING DEVICE

[76] Inventors: Dennis L. Bell; Linda J. Jaye, both of 15519 Hwy. 392, Greeley, Colo. 80631

[21] Appl. No.: 09/040,429

[22] Filed: Mar. 18, 1998

[51] Int. Cl.$^6$ ........................................ B60N 2/38
[52] U.S. Cl. ...................... 297/195.1; 297/209; 297/205; 297/217.6
[58] Field of Search ............... 297/202, 215.14, 297/440.22, 217.6, 195.1, 209, 214, 452.23, 452.25, 205

[56] References Cited

U.S. PATENT DOCUMENTS

| | | | |
|---|---|---|---|
| 619,179 | 2/1899 | Hunt | 297/209 |
| 1,771,095 | 7/1930 | Mesinger | 297/214 |
| 3,874,730 | 4/1975 | Marchello | 297/202 X |
| 3,982,288 | 9/1976 | Borne | 4/237 |
| 4,103,966 | 8/1978 | Allen | 297/214 X |
| 5,387,024 | 2/1995 | Bigolin | 297/202 |
| 5,489,139 | 2/1996 | McFarland | 297/195.1 |
| 5,676,420 | 10/1997 | Kuipers et al. | 297/205 X |
| 5,765,912 | 6/1988 | Bontrager | 297/214 |

*Primary Examiner*—Peter M. Cuomo
*Assistant Examiner*—Stephen Vu
*Attorney, Agent, or Firm*—Michael A. Capraro

[57] ABSTRACT

A crescent shaped seating device having a posterior outer curvature and an anterior inner curvature conforming to the natural curvature of the body when in a seated position. The seating device is continuously formed from a multi-element alloy balanced polyurethane semi-rigid material which produces a microcellular core with a tough textured exterior skin integrally formed with the core. Symmetrically arranged, mirror image at least two lateral support means provide additional padding, keep a user centered on the seating device and provide lateral support to the user. An internal frame is encased by and reinforces the seating device. Receiving means are fixedly attached to the internal frame, extend to the lower surface of the seating device and are removably attached to attaching rails. A light system renders the seating device highly visible.

8 Claims, 5 Drawing Sheets

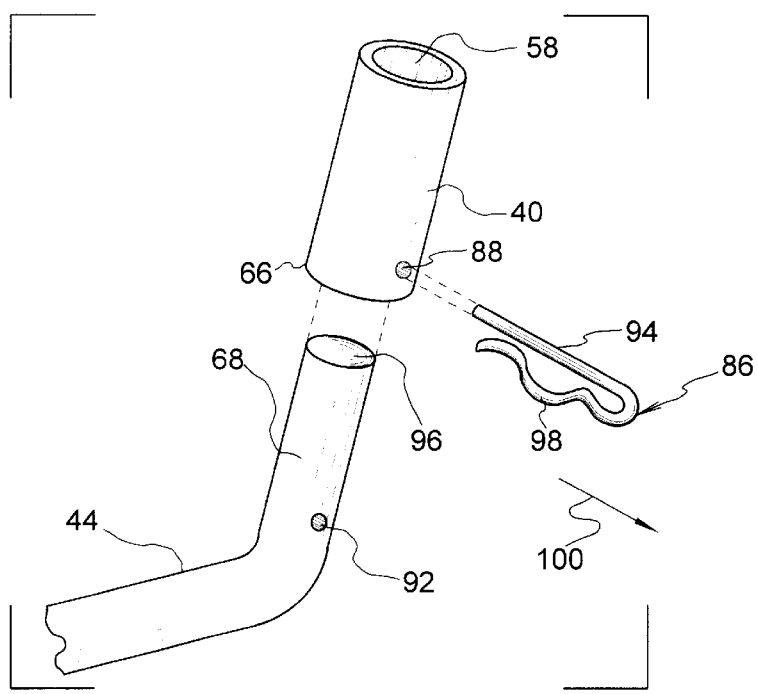
Figure 9
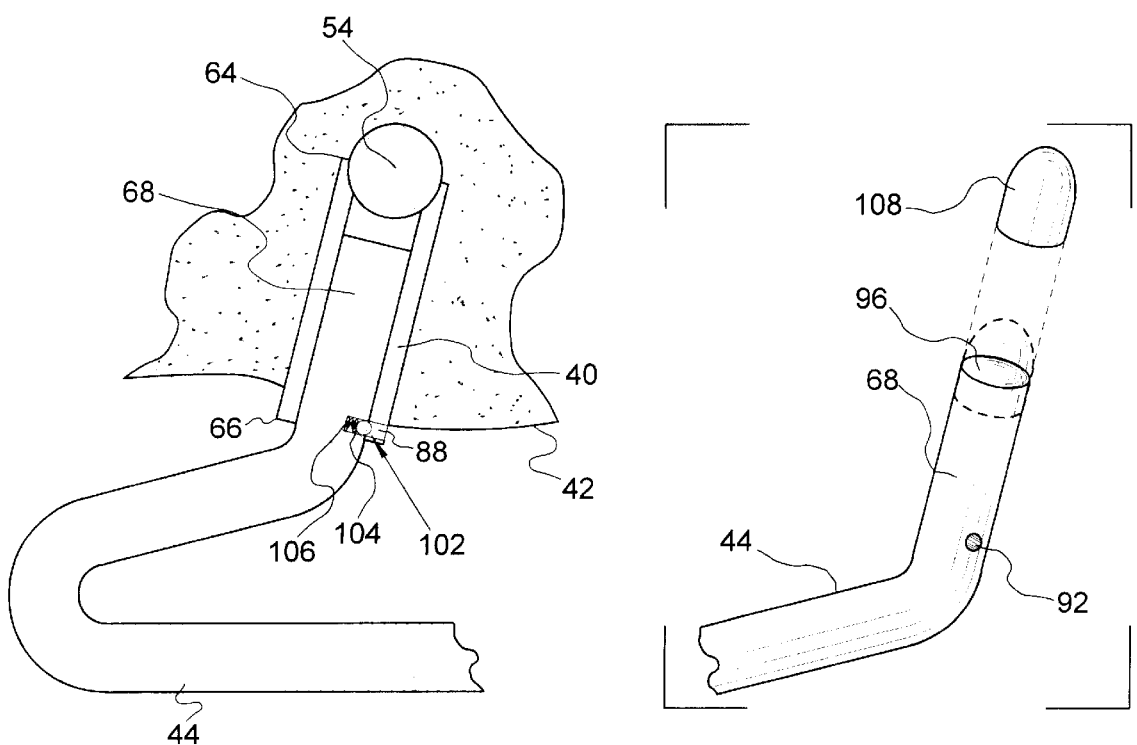
Figure 10
Figure 11

SEATING DEVICE

BACKGROUND OF THE INVENTION

This invention relates generally to seating devices and more specifically to a new and novel seating device for use on a variety of supporting devices such as bicycles, exercise equipment, tripod seat supports, monopod seat supports and other seat supports. The new and novel seating device is designed to alleviate physical distress, discomfort, and trauma while providing comfort to a user. The new and novel seating device is further designed to utilize the natural support structure of the human body.

While there are a wide variety of seating devices that provide some support for a user, these devices generally produce physical distress and discomfort to the user. For example, in the case of prior art bicycle seats, virtually all prior art bicycle seats have a rear cradle area which supports the user's buttocks and an elongated nose section or midsection which provides some additional support by contacting the user's perineum. Thus, when a user sits on a prior art bicycle seat, the bulk of the user's weight is supported by the rear cradle area. However, the rear cradle is generally designed to support only the medial portion of the user's buttocks. While the elongated nose section provides some additional support, its contact with the user's perineum often results in abrasions, tears, contusions, hemorrhoids and other physical distress caused by friction and impact on the user's perineum as the user pedals a prior art bicycle and rides over rough terrain, turns the bicycle and performs other common movements associated with bike riding. For a more complete description of and examples of prior art bicycle seats, see U.S. Pat. No. 5,571,273, Saainen; U.S. Pat. No. 5,524,961, Howard; U.S. Pat. No. 4,218,090, Hoffacker et al.; U.S. Pat. No. 3,997,142, Jacobs; and U.S. Pat. No. Des. 333,041, Choi et al.

Other types of prior art supporting devices, such as exercise equipment seats, also have an elongated or raised mid-section that contacts the user's perineum and can cause similar physical stress or discomfort, especially when used for extended periods of time. While padding may be added to these devices, it is generally insufficient to prevent physical stress and discomfort when the prior art device is used for extended periods of time for intense physical activity. For a more complete description of and examples of prior art exercise equipment seats, see U.S. Pat. No. 5,586,959, Adkins et al.; U.S. Pat. No. 5,458,553, Wu; U.S. Pat. No. Des. 321,225, Solow et al.; and U.S. Pat. No. Des. 315,646, Hood.

Additionally, as in the case of bike racing, the user will often shift their weight on the seating device or around the seating device. That is, the user may "stand" on the bicycle pedals and shift their body weight either in alignment with, or parallel to, the longitudinal axis of the bicycle in an effort to maintain control in a high speed turn or while in a descent down steep terrain. One problem that is encountered occurs when the user rests their abdomen on the seat in a downhill descent in order to become more aerodynamic and to better distribute their weight. Since prior art seats are configured with rather narrow rear saddles and an elongated nose or midsection, this cause extreme stress and impact on the abdominal muscles, the solar plexus and the sternum. This is especially true when the user is riding a mountain bike down rocky and rutted terrain.

Another problem that is encountered occurs when the user sits back down on the seat while riding the bicycle. Often, the user must sit down quickly in order to lower the weight of the body in relation to the bicycle, and thus lower the center of gravity. Since this motion is very quick and forceful, the user can slip on the seat, sometimes resulting in loss of control of the bicycle. This is especially true when the user is riding over rough terrain and the seat is constantly in motion, making it difficult to judge the point of contact with the seat.

SUMMARY OF THE INVENTION

To overcome the before described considerations and problems inherent in and encountered with prior art seating devices, there is provided by the subject invention a unique seating device that effectively alleviates physical distress and discomfort while providing comfort to a user. The new and novel seating device is further designed to conform to the natural shape of the human body.

Applicant's new and novel seating device is generally crescent shaped having a posterior outer curvature and an anterior inner curvature and has been designed to conform to the natural curvature and support structure of the body when in a seated position. Additionally, the crescent configuration of the new and novel seating device allows users to comfortably rest their abdomen on the new and novel seating device without extreme stress and impact on the abdominal muscles, the solar plexus and the sternum, when the user is riding a mountain bike down rocky and rutted terrain and has shifted their weight behind the new and novel seating device to maintain balance and improve aerodynamics.

The new and novel seating device is continuously formed from a multi-element alloy balanced polyurethane semi-rigid material. The multi-element polyurethane material produces a microcellular core with a tough textured exterior skin, or outer surface, which is integrally formed with the core. The semi-rigid material provides stability, impact absorption, impact resistance and resiliency. Thus, the new and novel seating device is not only comfortable and durable, it also maintains its original shape during the life of the unit. Additionally, the textured exterior skin provides a slightly positive gripping surface that prevents the user from slipping on the new and novel seating device. Thus, when the user abruptly sits down on or shifts their weight on the new and novel seating device, the slight gripping effect of the textured exterior skin prevents slippage and loss of control of the bicycle without hindering the user's ability to purposely shift body position on the new and novel seating device.

The new and novel seating device is constructed having a body with at least two lateral support means continuously formed thereon, the at least two lateral support means being symmetrically arranged mirror images of one another and extending outward to form the tips of the crescent shape. The lateral support means are designed to keep a user centered on the new and novel seating device and to prevent physical distress by transferring support from the user's perineum to the outside posterior portion of the thighs. Additionally, at least one support pad is continuously formed on the upper surface of the body to provide additional contact, and therefore additional cushioning and stability, to the sits bones of the user, as well as providing additional stability to the user's pelvic region.

In the Preferred Embodiment, an internal frame is comprised of a first support member and a second support member fixedly attached to the first support member, and is encased by the body and the continuously formed at least two lateral support means. Receiving means are fixedly attached to the internal frame and extend downwardly to the lower surface of the body of the seating device. The receiving means are removably attached to attaching rails which in turn are removably attached to a standard prior art bicycle post seat attaching device or other standard attaching devices that may be present on a variety of supporting devices such as exercise equipment, tripod seat supports, monopod seat supports and other seat supports.

In another embodiment, a modified internal frame is comprised of a continuously formed support plate encased by the body and the continuously formed at least two lateral support means. Receiving means are fixedly attached to the modified internal frame and extend downwardly to the lower surface of the body of the seating device.

The receiving means are fixedly attached to the internal frame at predetermined locations. The predetermined locations for attachment of the receiving means are generally oriented in a central portion of the seating device and have been designed so that at least two receiving means align with an attaching rail. The predetermined positioning of the receiving means on the first support member and second support member allows the receiving means to properly align with mounting studs formed on the attaching rails. In the Preferred Embodiment, there are two attaching rails and each attaching rail has at least two mounting studs formed thereon. When the attaching rails are positioned on a prior art attaching device, such as a standard prior art bicycle post seat attaching device, the receiving means are aligned with and engage the mounting studs of the attaching rail. Also, in the Preferred Embodiment, at least four receiving means are attached to the internal frame, two receiving means being fixedly attached to the first support member and two receiving means being fixedly attached to the second support member. The receiving means are further symmetrically aligned in pairs so that one mounting stud of an attaching rail is removably engaged by one receiving means and the other mounting stud of the same attaching rail is removably engaged by another symmetrically aligned receiving means. Additionally, in the Preferred Embodiment, the internal frame, receiving means and attaching rails are constructed from a rigid, non-flexing material such as steel, aluminum, brass and other metal alloys, or from rigid synthetic alloys such as glass filled nylon, ABS plastic, and other rigid synthetic alloys.

A light system is integrated into the body of the new and novel seating device and further comprises an internally integrated electrical power supply, a pressure switch, a manual switch and a light strip or bar. The electrical power supply is electrically connected to the pressure switch and to the manual switch by electrical wiring. In the Preferred Embodiment, the electrical power supply is generally a battery pack which supplies electrical power to the light strip or bar. The user can turn the light system off, activate the pressure switch, or provide continuous power to the light strip or bar via the manual switch. The pressure switch is a standard mechanical contact pressure switch that allows electrical current to flow from the electrical power supply to the light strip to illuminate lamps contained therein when a user is seated on the seating device. The lamp casing is constructed from reflective material providing high visibility from incidental light and warning others of the user's presence.

The new and novel seating device is attached to prior art supporting devices such as prior art bicycles exercise equipment, tripod seat supports, monopod seat supports and other seat supports by standard prior art rail holding devices which grip the attaching rails. In the Preferred Embodiment, the attaching rails have been designed to allow adjustment of the body of the seating device along the longitudinal axis of a prior art bicycle or other prior art seating support device. The new and novel seating device also employs locking means to removably lock the body of the seating device onto the mounting studs of the attaching rails, thereby preventing accidental releasing of the seating device from the mounting studs when in use on a prior art supporting device. In the Preferred Embodiment, the locking means is a spring action hairpin clip that can be disposed through bores in the receiving means and the mounting stud. The spring arm of the locking means holds the locking means in place by exerting spring action force on the receiving means. The body of the seating device is removably unlocked from the mounting studs by pulling the locking means from the bores and disengaging the spring arm from the receiving means, and then pulling the new and novel seating device up and away from the mounting studs.

In another embodiment, a modified locking means is comprised of at least one spring-ball located in the mounting stud and partially contained within a spring-ball housing. As the receiving means engages the mounting stud, the at least one spring-ball is temporarily compressed further into the spring-ball housing which allows the receiving means to slide over the mounting stud. When the at least one spring-ball aligns with a bore formed in the receiving means, the at least one spring-ball is partially released into the bore thereby removably locking the receiving means onto the mounting stud. The modified locking means allows the user to easily and readily lock the body of the seating device onto the mounting studs by simply pushing the body of the seating device into place, and therefore automatically into a locked position, on the attaching rails. To unlock the body of the seating device from the attaching rails, the user simply pulls the body of the seating device up and away from the attaching rails. Stud protectors are provided with the new and novel seating device to protect the ends of the mounting studs of the attaching rails after the body of the seating device has been removed from the attaching rails.

To achieve the foregoing and other advantages, the present invention provides a new and novel seating device designed to effectively alleviate physical distress, discomfort and trauma while providing comfort to a user. The new and novel seating device is further designed to conform to the natural shape and support structure of the human body.

The more important features of the present invention have been broadly outlined in order that the detailed description thereof that follows may be better understood and in order that the present contribution to the art may be better appreciated. There are additional features of the invention that will be more fully described hereinafter and which, together with the features outlined above, will form the subject matter of the claims appended hereto. Those skilled in the art will appreciate that the conception, upon which the present disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory review the nature and essence of the technical disclosure of the application. The abstract is neither intended to define the invention of the application, which is measured by the claims, nor is it intended to be limiting as to the scope of the invention in any way.

Accordingly, it is an object and advantage of the invention to provide a new and novel seating device that alleviates physical distress, discomfort and trauma.

Another object and advantage of the invention is to provide a new and novel seating device that is comfortable to use.

Another object and advantage of the invention is to provide a new and novel seating device that conforms to the natural shape and support structure of the human body.

Another object and advantage of the invention is to provide a new and novel seating device that prevents unintentional slippage of the user on the seating device.

Still another object and advantage of the invention is to provide a new and novel seating device that allows the user to utilize the seating device to comfortably maintain balance and control of the supporting device.

Another object and advantage of the invention is to provide a new and novel seating device that is removably locked onto the supporting device.

Another object and advantage of the invention is to provide a new and novel seating device that is easily and readily removed from the supporting device.

Another object and advantage of the invention is to provide a new and novel seating device that is highly visible.

Another object and advantage of the invention is to provide a new and novel seating device which may be easily and efficiently manufactured and marketed.

Yet another object and advantage of the invention is to provide a new and novel seating device which is of durable and reliable construction.

These and other objects and advantages will become apparent from review of the drawings and from a study of the Description of the Preferred Embodiment relating to the drawings which has been provided by way of illustration only.

BRIEF DESCRIPTION OF THE DRAWINGS

FIG. 9 is an exploded perspective view of a portion of the applicant's new and novel seating device.

FIG. 10 is an enlarged sectional view of a portion of the applicant's new and novel seating device similar to FIG. 7.

FIG. 11 is an exploded perspective view of a portion of an attaching rail similar to FIG. 8.

DESCRIPTION OF THE PREFERRED EMBODIMENT

Figure 1:
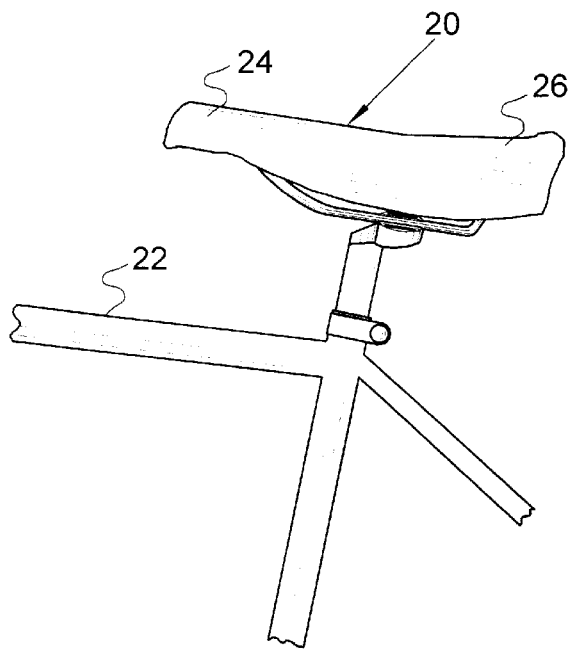
FIG. 1 is a side elevational view of a prior art bicycle seat.

Referring to the drawings in general there is shown the applicant's new and novel seating device shown generally by the numeral 28. Applicant's new and novel seating device 28 has been designed to be utilized on a variety of supporting devices such as bicycles, exercise equipment, tripod seat supports, monopod seat supports and other seat supports, and has been particularly designed to be utilized on prior art bicycles of various types. Applicant's new and novel seating device 28 is shown in the Preferred Embodiment and in the drawings in general as utilized on a prior art bicycle 22 for purposes of illustration only.

Figure 2:
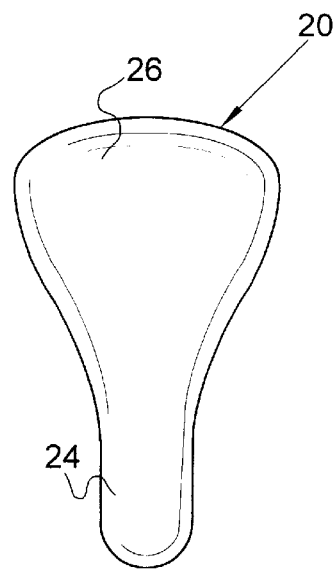
FIG. 2 is a top plan view of a prior art bicycle seat.

Referring in particular to FIGS. 1 and 2 of the drawings, there is shown a typical prior art bicycle seat, shown generally by the numeral 20. FIG. 1 of the drawings is a side elevational view of a prior art bicycle seat 20 adjustably mounted on a prior art bicycle shown generally by the numeral 22. Only a portion of the prior art bicycle 22 is shown in FIG. 1 for purposes of clarity. FIG. 2 of the drawings is a top plan view of a prior art bicycle seat 20. The prior art bicycle seat 20 is shown in the Preferred Embodiment and in FIGS. 1 and 2 of the drawings for purposes of illustration only.

FIGS. 1 and 2 illustrate the typical configuration of prior art bicycle seats. Other prior art bicycle seats may vary slightly in width, length, size and the amount of padding, if any. However, nearly all prior art bicycle seats are based on the general configuration illustrated in FIGS. 1 and 2 of the drawings. These types of prior art bicycle seats have an elongated nose section 24 and a rear cradle area 26. When a user sits on a prior art bicycle seat 20, the bulk of the user's weight is supported by the rear cradle area 26 which cradles only the medial portion of the user's buttocks. The elongated nose section 24 provides some additional support, primarily contacting the user's perineum. As a user pedals a prior art bicycle 22 and rides over rough terrain, turns the bicycle and performs other common movements associated with bike riding, the configuration of a prior art bicycle seat causes undue stress, friction and impact on the user's perineum. This can result in abrasions, tears, contusions, hemorrhoids and other physical distress.

Figure 3:
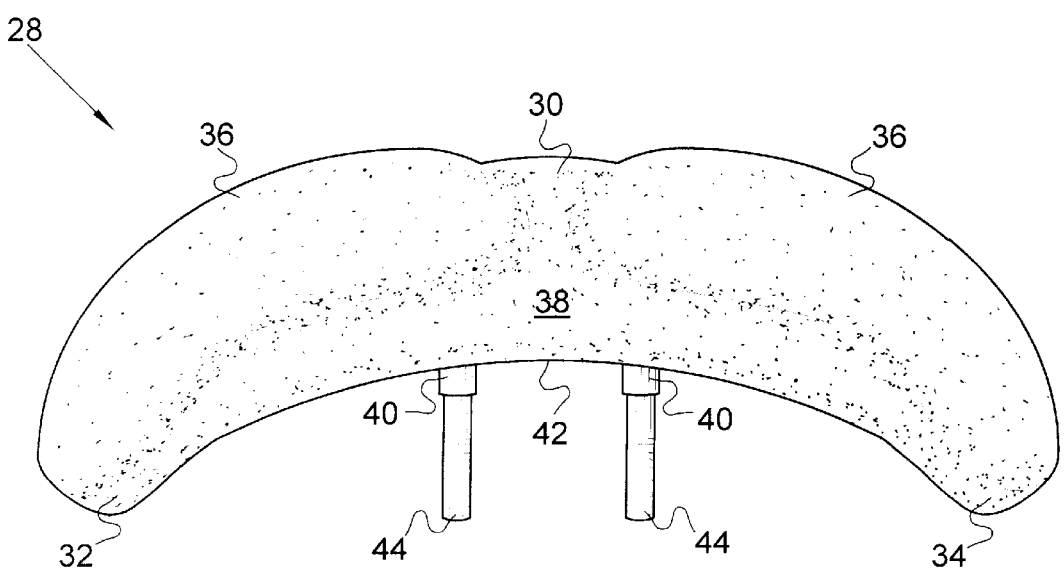
FIG. 3 is a front perspective view of the applicant's new and novel seating device.

Referring now to FIG. 3 of the drawings, there is shown a front perspective view of applicant's new and novel seating device shown generally by the numeral 28. A body 30 has at least two lateral support means 32 and 34 continuously formed thereon, the at least two lateral support means 32 and 34 being symmetrically arranged mirror images of one another. The lateral support means 32 and 34 are designed to keep a user centered on the seating device 28 and to prevent physical distress by transferring support from the user's perineum to the outside posterior portion of the thighs.

At least one support pad 36 is continuously formed on the upper surface 38 of the body 30. The at least one support pad 36 provides additional cushioning and stability for the user. In the Preferred Embodiment and in FIGS. 3 and 6 of the drawings, two at least one support pads 36 are illustrated, one at least one support pad 36 being continuously formed on the upper surface 38 of one at least two lateral support means 32, and another at least one support pad 36 being continuously formed on the upper surface 38 of another at least two lateral support means 34. In another embodiment, only one at least one support pad 36 is continuously formed on the upper surface 38 of the body 30 and extends onto one at least two lateral support means 32 and another at least two lateral support means 34. Other numbers and configurations of support padding known in the art may also be used and are considered to be within the spirit and scope of the applicant's invention. The continuous formation of the at least one support pad 36 and the another at least two lateral support means 32 and 34 will be discussed more fully hereinafter.

Still referring to FIG. 3 of the drawings, there is shown a plurality of receiving means 40 protruding downwardly from the lower surface 42 of the body 30 of the seating device 28. The receiving means 40 are designed to be removably attached to attaching rails 44. The attaching rails 44 are removably attached to a standard prior art bicycle post seat attaching device or other standard attaching devices that may be present on a variety of supporting devices such as exercise equipment, tripod seat supports, monopod seat supports and other seat supports. A prior art seat attaching device is not shown in FIG. 3 for purposes of clarity but is clearly shown in FIGS. 1 and 11.

Figure 4:
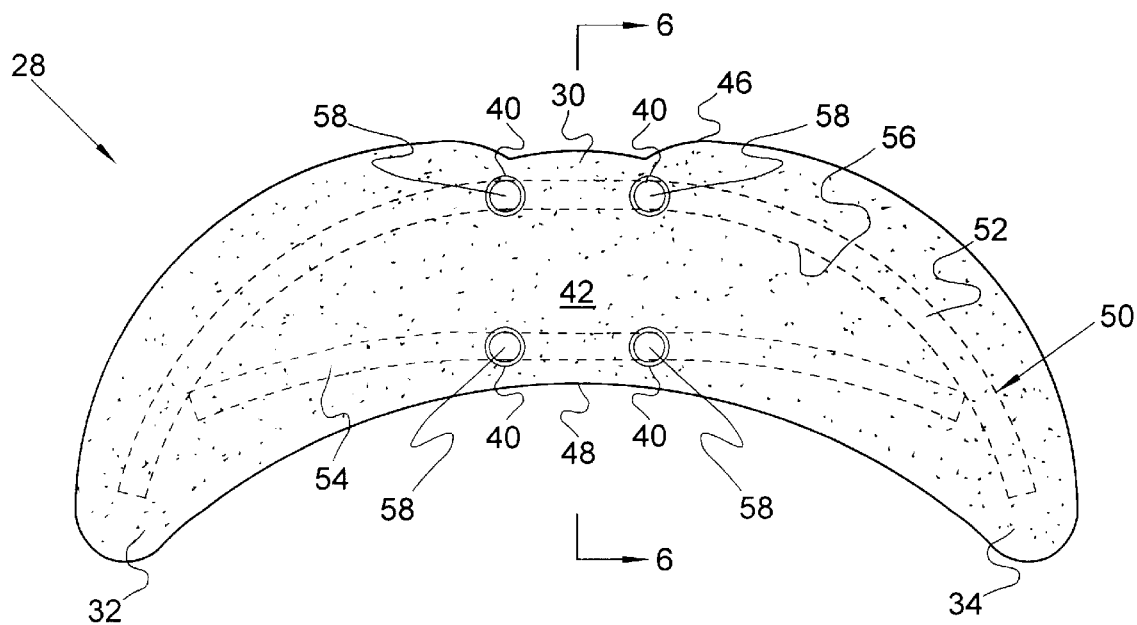
FIG. 4 is a bottom plan view of the applicant's new and novel seating device.

Referring now to FIG. 4 of the drawings, there is shown a bottom plan view of the new and novel seating device 28. In the Preferred Embodiment, the generally crescent shaped seating device 28 has been designed to conform to the natural curvature of the body when in a seated position and is further designed having a posterior outer curvature 46 and an anterior inner curvature 48. In the Preferred Embodiment, an internal frame, generally shown by the numeral 50, is comprised of a first support member 52 and a second support member 54. The first support member 52 is encased by the body 30 and the continuously formed at least two lateral support means 32 and 34, the first support member 52 being generally curved and juxtaposed near the posterior outer curvature 46. Second support member 54 is also encased by the body 30 and the continuously formed at least two lateral support means 32 and 34 and is fixedly attached to the first support member 52, the second support member 54 spanning the inner curvature 56 of the first support member 52 and being juxtaposed near the inner curvature 48 of the seating device 28. The second support member 54 reinforces the first support member 52 and provides additional support for the seating device 28. The first support member 50 and second support member 52 are shown as dashed lines in FIG. 4 of the drawings for purposes of clarity.

A plurality of receiving means 40 are fixedly attached to the first support member 52 and the second support member 54 of the internal frame 50 at predetermined locations on the first support member 52 and the second support member 54, the receiving means 40 being generally cylindrical and positioned downwardly through the body 30. A bore 58 is centrally and longitudinally formed through the receiving means 40. The predetermined locations for attachment of the receiving means 40 are generally oriented in a central portion of the seating device 28 and designed so that at least two receiving means 40 align with an attaching rail 44. The attaching rail 44 is not shown in FIG. 4 of the drawings, but is clearly shown in FIGS. 3, 5, 6, 7, 9 and 11. Alignment of the receiving means 40 with an attaching rail 44 will be discussed more fully hereinafter.

In the Preferred Embodiment, the internal frame 50 and receiving means 40 are constructed from a rigid, non-flexing material such as steel, aluminum, brass and other metal alloys or from rigid synthetic alloys such as glass filled nylon, ABS plastic, and other rigid synthetic alloys. Also in the Preferred Embodiment, the second support member 54 is fixedly attached to the first support member 52, and the receiving means 40 are fixedly attached to the internal frame 50, by welding, brazing, high temperature fusion, or other metal joining methods known in the art or by continous molding processes known in the art. Other rigid materials and other methods of joining and molding known in the art may also be used and are considered to be within the spirit and scope of the applicant's invention.

Figure 5:
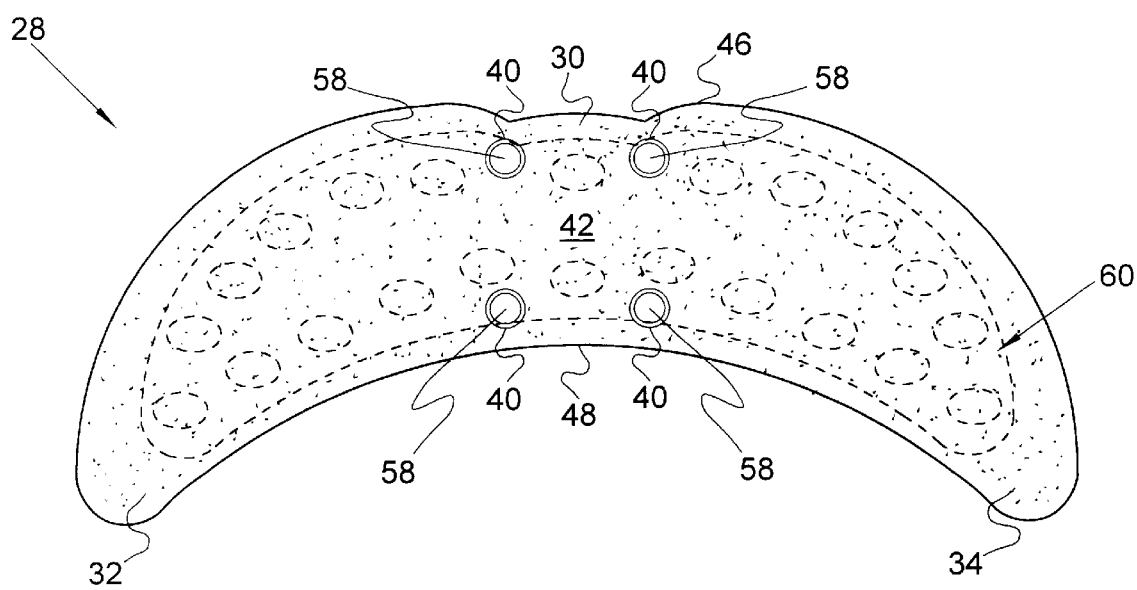
FIG. 5 is a bottom plan view of the applicant's new and novel seating device.

Referring now to FIG. 5 of the drawings, there is shown a modified internal frame, shown generally by the numeral 60. FIG. 5 of the drawings is a bottom plan view of the new and novel seating device 28. The modified internal frame 60, is comprised of a generally flat plate having a generally crescent shape. The modified internal frame 60 is encased by the body 30 and the continuously formed at least two lateral support means 32 and 34, so that the modified internal frame 60 is centrally located within the seating device 28. The modified internal frame 60 may also be perforated to allow reinforcement of the modified internal frame 60 to the molded seating device 28 and to alleviate shifting of the seating device 28 around the modified internal frame 60. The modified internal frame 60 is shown in dashed lines in FIG. 5 of the drawings for purposes of clarity.

A plurality of receiving means 40 are continuously formed on the bottom surface 62 of the modified internal frame 60 at predetermined locations, the receiving means 40 being generally cylindrical and positioned downwardly through the body 30. A bore 58 is centrally and longitudinally formed through the receiving means 40.

The modified internal frame 60 is constructed from a rigid, non-flexing material such as steel, aluminum, brass and other metal alloys or from rigid synthetic alloys such as glass filled nylon, ABS plastic, and other rigid synthetic alloys. Also, the receiving means 40 are joined to the modified internal frame 60 by welding, brazing, high temperature fusion, or other metal joining methods known in the art or by continuous molding processes known in the art. Other rigid materials and other methods of joining and molding known in the art may also be used and are considered to be within the spirit and scope of the applicant's invention.

Figure 6:
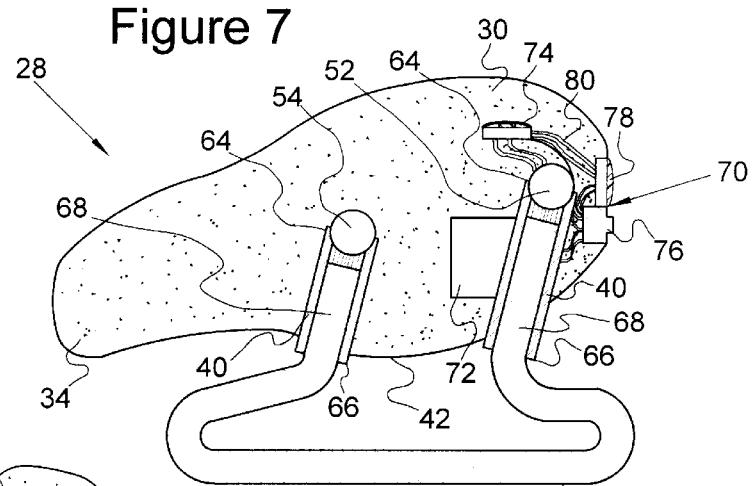
FIG. 6 is a sectional view of the applicant's new and novel seating device taken along lines 5—5 of FIG. 4 of the drawings.

Referring now to FIG. 6 of the drawings, there is shown a sectional view of the applicant's new and novel seating device taken along lines 6—6 of FIG. 4 of the drawings. The seating device 28 is continuously formed from a semi-rigid material such as polyurethane foam using inverted casting processes known in the art. In the Preferred Embodiment, a multi-element alloy balanced polyurethane material of the type developed for reaction injection molding (RIM) applications is used. The multi-element polyurethane material produces a microcellular core with a tough textured exterior skin which is integrally formed with the core. The semi-rigid material provides stability, impact absorption, impact resistance and resiliency. Thus, the seating device 28 is not only comfortable and durable, it also maintains its original shape during the life of the unit. Additionally, the textured exterior skin provides a slightly positive gripping surface that prevents the user from slipping on the seating device 28.

In the Preferred Embodiment, the body 30, one at least two lateral support means 32, another at least two lateral support means 34 and at least one support pad 36 are continuously molded resulting in the configuration illustrated in FIG. 1, wherein the at least one support pad 36 is an integral raised portion of the one at least two lateral support means 32, the another at least two lateral support means 34 and the body 30. The separation of the at least one support pad 36 between the one at least two lateral support means 32 and the another at least two lateral support means 34 shown in FIG. 1, has been designed to provide maximum comfort for a user. In another embodiment, the at least one support pad 36 is continuously formed on the one at least two lateral support means 32, the another at least two lateral support means 34 and the body 30, with no separation therein. Other semi-rigid materials and other methods of casting and molding known in the art may also be used and are considered to be within the spirit and scope of the applicant's invention.

Still referring to FIG. 6 of the drawings, and in the Preferred Embodiment, the receiving means 40 are downwardly oriented so that the proximal end 64 of one receiving means 40 contacts the ventral side of the first support member 52 and the proximal end 64 of another receiving means 40 contacts the ventral side of the second support member 54. The receiving means 40 extends downwardly through the body 30 while the distal end 66 of the receiving means 40 exits through the lower surface 42 of the body 30 of the seating device 28. The receiving means 40 are fixedly attached to the first support member 52 and the second support member 54 as previously described.

The receiving means 40 have been designed to removably engage a mounting stud 68 of attaching rail 44 which is removably attached to a standard prior art bicycle post seat attaching device or other standard attaching devices that may be present on a variety of supporting devices such as exercise equipment, tripod seat supports, monopod seat supports and other seat supports. A prior art seat attaching device is not shown in FIG. 6 of the drawings, but is clearly shown in FIGS. 1 and 12.

Referring briefly back to FIG. 4 of the drawings, it can be seen that the predetermined positioning of the receiving means 40 on the first support member 52 and second support member 54, allows the receiving means 40 to properly align with mounting studs 68 of the attaching rail 44. When the attaching rails 44 are positioned on a prior art attaching device, such as a standard prior art bicycle post seat attaching device, the receiving means 40 are aligned with and engage the mounting studs 68 of the attaching rail 44. In the Preferred Embodiment, at least four receiving means 40 are attached to the internal frame 50, two receiving means 40 being fixedly attached to the first support member 52 and two receiving means 40 being fixedly attached to the second support member 54. Each receiving means 40 that is attached to the first support member 52 is further symmetrically aligned with another receiving means 40 fixedly attached to second support member 54. Also in the Preferred Embodiment, each attaching rail 44 has at least two mounting studs 68 formed thereon. One mounting stud 64 of an attaching rail 44 is removably engaged by one receiving means 40 attached to the first support member 52, and the other mounting stud 68 of the same attaching rail 44 is removably engaged by another receiving means 40 attached to, and symmetrically aligned on, the second support member 54. At least two attaching rails 44 are removably engaged by at least four receiving means 40 in the Preferred Embodiment, thereby allowing the seating device 28 to be properly positioned and aligned on a variety of supporting devices such as bicycles, exercise equipment, tripod seat supports, monopod seat supports and other seat supports having seat attaching devices thereon.

Referring again to FIG. 6 of the drawings and in the Preferred Embodiment, the distal end 66 of the receiving means 40 protrudes from the lower surface 42 of the body 30. This configuration allows the body 30 of the seating device 28 to be removably locked onto the attaching rails 44 via locking means 86. The locking means 86 is not shown in FIG. 6 of the drawings, but is clearly shown in FIGS. 8, 9 and 12, and will be discussed more fully hereinafter.

FIG. 6 of the drawings also shows a light system, shown generally by the numeral 70. The light system 70 is integrated into the body 30 of the seating device 28 and further comprises an internally integrated electrical power supply 72, a pressure switch 74, a manual switch 76 and a light strip or bar 78. The electrical power supply 72 is electrically connected to the pressure switch 74 and to the manual switch 76 by electrical wiring 80. In the Preferred Embodiment, the electrical power supply 72 is generally a battery pack which supplies electrical power to the light strip or bar 78 and the manual switch 76 is a three position sliding switch that allows the user to turn the light system 70 off, activate the pressure switch 74, or provide continuous power to the light strip or bar 78. The pressure switch 74 is a standard mechanical contact pressure switch that allows electrical current to flow from the electrical power supply 72 to the light strip or bar 78 when depressed, thereby illuminating the light strip 78 when a user is seated on the seating device 28. Other electrical power supplies and other electrical switching mechanisms known in the art may also be used and are considered to be within the spirit and scope of the applicant's invention.

Figure 7:
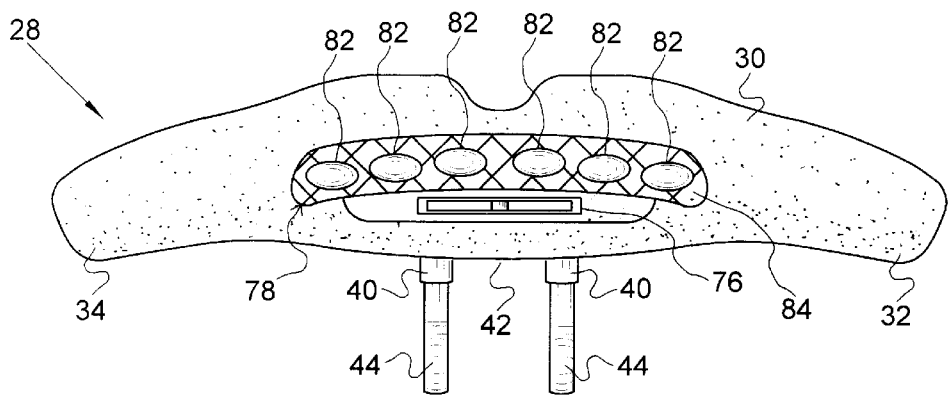
FIG. 7 is a rear elevational view of the applicant's new and novel seating device.

Referring now to FIG. 7 of the drawings, there is shown a rear elevational view of the applicant's new and novel seating device. The light bar 78, having a plurality of illuminating lamps 82, is centrally located in the posterior of the seating device 28 so that the illuminating lamps 82 are visible by anyone behind the user. In the Preferred Embodiment, the lamp casing 84 is constructed from reflective material. Thus, incidental light reflecting off of the lamp casing 84 provides high visibility and warns others of the user's presence during daylight hours. If the light bar 78 is illuminated by the electrical power supply 72, the illuminating lamps 82 provide high visibility and warns others of the user's presence during evening or night hours. The electrical power supply 72 can not be seen in FIG. 7 of the drawings, but is clearly shown in FIG. 6. Other configurations and numbers of illuminating lamps and reflective materials known in the art may also be used and are considered to be within the spirit and scope of the applicant's invention.

Figure 8:
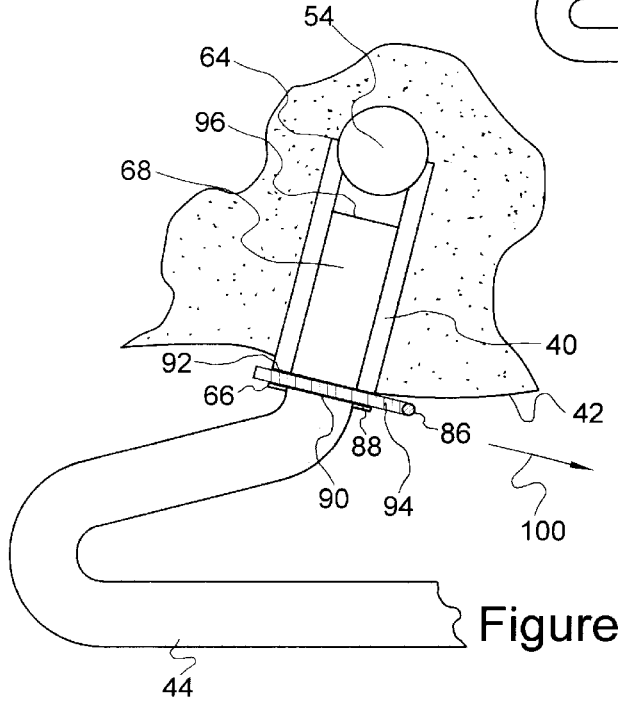
FIG. 8 is an enlarged sectional view of a portion of the applicant's new and novel seating device.

Referring now to FIGS. 8 and 9 of the drawings, there will be shown and described in detail the locking means, shown generally by the numeral 86. FIG. 8 is an enlarged sectional view of a portion of the applicant's new and novel seating device. FIG. 9 is an exploded perspective view of the receiving means 40, attaching rail 44 and locking means 86. The locking means 86 removably locks the body 30 of the seating device 28 onto the mounting studs 68 of the attaching rails 44, thereby preventing accidental releasing of the 30 of the seating device 28 from the mounting studs 68. In the Preferred Embodiment, the locking means 86 is a spring action hairpin clip. Other locking means known in the art may also be used and are considered to be within the spirit and scope of the applicant's invention.

A bore 88 and an opposite bore 92 are laterally formed through the distal end 66 of the receiving means 40, the bore 88 and the opposite bore 92 having a diameter slightly larger than the diameter of shaft 94 of the locking means 86. The opposite bore 92 is positioned in line with and directly opposite of the bore 88. The opposite bore 92 can not be seen in FIG. 9 of the drawings but is clearly shown in FIG. 8. When the body 30 of the seating device 28 is in a locked position on the mounting studs 68, as shown in FIG. 8, the shaft 94 of the locking means 86 is disposed through the bore 88 of the receiving means 40, through locking means receiving bore 90 and through the opposite bore 92 of the receiving means 40. The locking means receiving bore 90 is also laterally formed through the mounting stud 68 away from the end 96 of the mounting stud 68, so that the locking means receiving bore 90 aligns with the bore 88 and the opposite bore 92 of the receiving means 40. Spring arm 98 of the locking means 86 holds the locking means 86 in place by exerting spring action force on the receiving means 40, the spring arm 98 being shown in FIG. 9. The body 30 of the seating device 28 is removably unlocked from the mounting studs 68 by pulling the locking means 86 from the opposite bore 92, the locking means receiving bore 90 and the bore 88 in the direction of the arrow 100, thereby disengaging the spring arm 98 from the receiving means 40. Other locking means known in the art and other positions and configurations may also be used and are considered to be within the spirit and scope of the applicant's invention.

In another embodiment, a modified locking means, shown generally by the numeral 102, may be utilized and is shown in FIG. 10 of the drawings. FIG. 10 is an enlarged sectional view of a portion of the applicant's new and novel seating device similar to FIG. 8 of the drawings. The modified locking means 102 is comprised of at least one spring-ball 104 located in the mounting stud 68 and partially contained within spring-ball housing 106. The at least one spring-ball 104 is located in the mounting stud 68 having the same orientation and alignment with the bore 88, as the locking means receiving bore 90 is aligned with the bore 88, as previously described. That is, the at least one spring-ball 104 of the modified locking means 102 is designed to utilize the same location and orientation in the mounting stud 68 as the locking means receiving bore 90 which has been described herein before.

As the receiving means 40 engages the mounting stud 68, the at least one spring-ball 104 is compressed further into spring-ball housing 106, allowing the receiving means 40 to slide over the mounting stud 68. When the at least one spring-ball 104 aligns with the bore 88, the at least one spring-ball 104 is partially released into the bore 88, thereby removably locking the receiving means 40 onto the mounting stud 68. The modified locking means 102 allows the user to easily and readily lock the body 30 of the seating device 28 onto the mounting studs 68 by simply pushing the body 30 of the seating device 28 into place, and therefore automatically into a locked position, on the attaching rails 44. To unlock the body 30 of the seating device 28 from the attaching rails 44, the user simply pulls the body 30 of the seating device 28 up and away from the attaching rails 44, thereby releasing the receiving means 40 from the modified locking means 102. Other locking means known in the art and other positions and configurations may also be used and are considered to be within the spirit and scope of the applicant's invention.

Referring now to FIG. 11 of the drawings, there is shown an exploded perspective view of a portion of the attaching rail 44, similar to FIG. 9. FIG. 11 illustrates stud protector 108 provided to protect the end 96 of the mounting studs 68 of attaching rails 44, after the body 30 of the seating device 28 has been removed from the attaching rails 44. A user may remove the body 30 of the seating device 28 from the attaching rails 44 for a variety of purposes, including, but not limited to, repair and maintenance of the seat supporting device to which the seating device 28 is attached, cleaning of the body 30 of the seating device 28 or the seat supporting device, and theft prevention of the body 30 of the seating device 28. In the Preferred Embodiment, a plurality of stud protectors 108 are provided and are rubber caps designed to fit tightly over and encompass the exposed ends 96 of the mounting studs 68. Other materials and other protecting devices known in the art may also be used and are considered to be within the spirit and scope of the applicant's invention.

Figure 12:
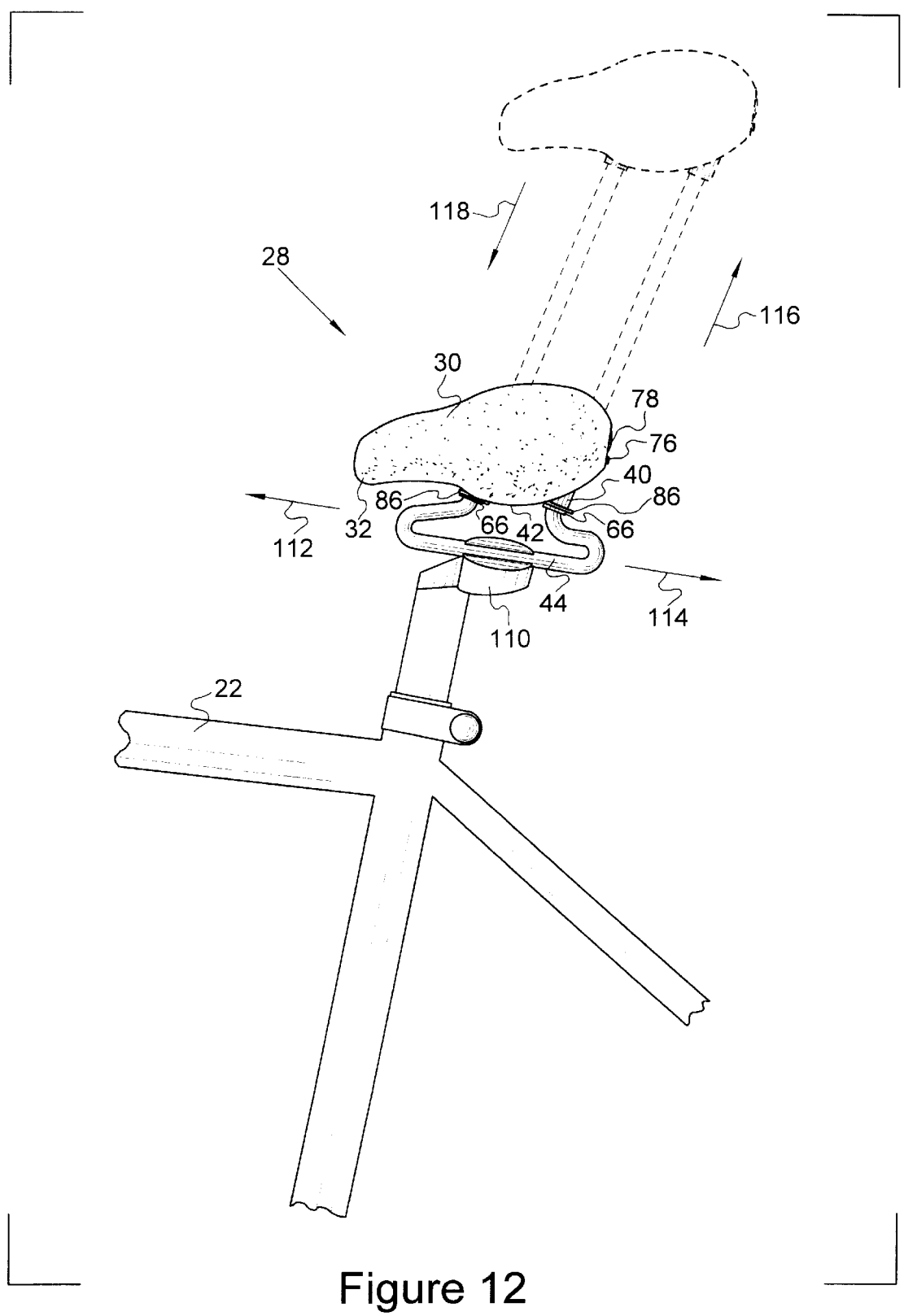
FIG. 12 is a side view of the applicant's new and novel seating device in position on a prior art bicycle.

Referring now to FIG. 12 of the drawings, there is shown a side view of the applicant's new and novel seating device 28 in position on a prior art bicycle 22. Only a portion of a prior art bicycle 22 is shown in FIG. 12 for purposes of clarity. Also, since the new and novel seating device 28 has been designed to be utilized on other supporting devices such as exercise equipment, tripod seat supports, monopod seat supports and other seat supports, the portion of the prior art bicycle 22 shown in FIG. 12 is for purposes of illustration only. The attaching rails 44 are held by standard prior art rail holding devices similar to the prior art rail holding device 110 illustrated in FIG. 12. In the Preferred Embodiment, the attaching rails 44 have been designed to allow adjustment of the body 30 of the seating device 28 along the longitudinal axis of the prior art bicycle 22 or other seating support device in the direction of the arrows 112 and 114.

The body 30 of the seating device 28 can be removably unlocked from the attaching rails 44 by removing the locking means 86 from the receiving means 40 and the mounting studs 68, as previously described. The body 30 of the seating device 28 can then be removed from the attaching rails 44 by pulling the body 30 of the seating device 28 up and away from the attaching rails 44 in the direction of the arrow 116. In the embodiment utilizing the modified locking means 102, the user simply pulls the body 30 of the seating device 28 up and away from the attaching rails 44 in the direction of the arrow 116 to disengage the body 30 of the seating device 28 from the attaching rails 44 as previously described. The modified locking means 102 is not shown in FIG. 12 of the drawings but is clearly shown in FIG. 10.

Still referring to FIG. 12 of the drawings, the body 30 of the seating device 28 is removably locked onto the attaching rails 44 by aligning the receiving means 40 with the mounting studs 68 of the attaching rails 44 and pushing the body 30 of the seating device 28 down and toward the attaching rails 44 in the direction of the arrow 118. The locking means 86 can then be inserted through the bores in the receiving means 40 and the mounting stud 68 to removably lock the body 30 of the seating device 28 onto the attaching rails 44. In the embodiment utilizing the modified locking means 102, the user simply pushes the body 30 of the seating device 28 down and toward the attaching rails 44 in the direction of the arrow 118 to automatically engage the modified locking means 102 as previously described. The modified locking means 102 is not shown in FIG. 12 of the drawings but is clearly shown in FIG. 10.

From the above it can be seen that the applicant's new and novel seating device accomplishes all of the objects and advantages presented herein before. Nevertheless it is within the spirit and scope of the invention that changes in the applicant's basic seating device may be made and the Preferred Embodiment and the modifications shown and described herein have only been given by way of illustration.

Having described my invention, I claim:

1. A seating device for use on a variety of supporting devices such as bicycles, exercise equipment, tripod seat supports, monopod seat supports and other seat supports, comprising:

a. a body having an upper surface and a lower surface;
   b. an internal frame internally formed in the body and encased by the body;
   c. a plurality of receiving means having a bore centrally and longitudinally formed therein, the receiving means also having bores laterally formed therein, the receiving means being fixedly attached to the internal frame, wherein the receiving means extend downwardly through the body and exit the lower surface of the body;
   d. at least one attaching rail removably attached to the receiving means, the attaching rail having at least two mounting studs formed thereon wherein the at least two mounting studs have bores laterally formed therein, where one of the at least two mounting studs removably engage the receiving means bore; and e. locking means removably disposed through the laterally formed bores of the receiving means and the at least two mounting studs, thereby removably locking the body onto the at least one attaching rail.

2. A seating device for use on a variety of supporting devices such as bicycles, exercise equipment, tripod seat supports, monopod seat supports and other seat supports, comprising:

a. a body having an upper surface and a lower surface;

b. a first support member internally formed in the body and encased by the body;

c. a second support member internally formed in the body and encased by the body, the second support member being fixedly attached to the first support member;

d. a plurality of receiving means fixedly attached to the first support member and the second support member, wherein the plurality of receiving means have a bore centrally and longitudinally formed through the receiving means, the receiving means also having bores laterally formed therein, the receiving means extending downwardly through the body and exiting the lower surface of the body;

e. at least one attaching rail having at least two mounting studs formed thereon, the at least two mounting studs have bores laterally formed therein, the attaching rail being removably attached to the receiving means; and f. locking means, wherein the locking means are removably disposed through the bores laterally formed through the receiving means and through the at least two mounting studs, thereby removably locking the body onto the at least one attaching rail.

3. A seating device for use on a variety of supporting devices such as bicycles, exercise equipment, tripod seat supports, monopod seat supports and other seat supports, comprising:

a. a body having an upper surface, a lower surface, a posterior outer curvature and an inner curvature;

b. at least two lateral support means continuously formed on the body, wherein the at least two lateral support means are mirror images of one another;

c. a first support member internally formed in the body having at least two lateral support means, the first support member being generally curved and juxtaposed near the posterior outer curvature of the body;

c. a second support member internally formed in the body having at least two lateral support means, the second support member being fixedly attached to the first support member and being juxtaposed near the inner curvature of the body;

d. a plurality of receiving means fixedly attached to the first support member and the second support member, wherein the plurality of receiving means extend downwardly through the body and exit at the lower surface of the body; and e. at least one attaching rail removably attached to the receiving means, the at least one attaching rail having at least two mounting studs formed thereon.

4. The seating device as defined in claim 3 wherein the receiving means has a bore centrally and longitudinally formed through the receiving means, the bore removably engaging one of the at least two mounting studs.

5. The seating device as defined in claim 4, wherein the receiving means and the at least two mounting studs have bores laterally formed therein.

6. The seating device as defined in claim 5 wherein locking means are removably disposed through the bores formed in the receiving means and the at least two mounting studs, thereby removably locking the body onto the at least one attaching rail.

7. The seating device as defined in claim 3 wherein the body is comprised of a multi-element alloy balanced polyurethane semi-rigid material having a microcellular core and an integrated tough textured exterior skin.

8. The seating device as defined in claim 3 further comprising a light system integrally formed in the body.

* * * * *